Patented Aug. 17, 1937

2,090,233

UNITED STATES PATENT OFFICE 2,090,233

PROCESS FOR MANUFACTURE OF MERCAPTO ARYL THIAZOLES

Harold P. Roberts, Akron, Ohio, assignor to Wingfoot Corporation, Wilmington, Del., a corporation of Delaware No Drawing. Application November 1, 1935, Serial No. 47,907

6 Claims. (Cl. 260—44)

This invention relates to improvements in the methods of preparing mercapto aryl thiazoles, and particularly, to improvements in the manufacture of mercaptobenzothiazole.

Heretofore, various ways of synthesizing mercapto aryl thiazoles more particularly mercaptobenzothiazole, have been known. Of these, the most successful has undoubtedly been the process disclosed in Kelly Patent 1,631,871, according to which mercapto aryl thiazoles are formed by simultaneously interacting carbon bisulphide, sulphur and a primary aromatic amine. Because of such factors as the purity of the product, the high degree of efficiency which is possible, and the available abundance of the required raw materials, the Kelly process has been and is pre-eminently successful among the recognized methods for the commercial manufacture of the mercapto aryl thiazoles.

This invention is concerned in particular with improvements in the successful Kelly process, but, as will be apparent from the following description, it is not limited thereto. As previously stated, the Kelly process provides for the preparation of mercapto aryl thiazoles by the interaction of carbon bisulphide, sulphur and a primary aromatic amine. The Kelly reaction is carried out under pressure, preferably in an autoclave, and the product of the reaction is discharged into a dilute aqueous solution of sodium hydroxide or other alkali. The mercaptobenzothiazole, itself water insoluble, formed during the reaction reacts with the basic material to form an alkaline salt of mercaptobenzothiazole which is water soluble.

In the most efficient commercial Kelly process from the standpoint of time of reaction, heat and pressure, there are some by-products, notably benzothiazole and 1-anilido benzothiazole, and some unreacted sulphur. These non-mercaptobenzothiazole bodies are in the nature of tars and do not dissolve in the aqueous alkaline solution but settle out. The liquid portion containing the alkaline mercaptobenzothiazole is decanted, then acidified with HCl or H2SO4, whereupon free mercaptobenzothiazole precipitates. It is then dried, and, with the most practical commercial procedure, is obtained in a purity of from 90 to 95% and in a yield of 85–90% based on the aniline originally used.

It has been noted that in this Kelly process when practiced commercially an equilibrium is apparently reached in each batch upon the formation of about 85% mercaptobenzothiazole, no more mercaptobenzothiazole forming unless uneconomical and time-consuming steps are conducted. The non-mercaptobenzothiazole bodies which are in the nature of tars and are a fluid, dark colored, sticky mixture which may comprise sulphur, aniline, thioaniline, benzothiazole and 1-anilido benzothiazole are usually discarded. These tars form in each batch and it has been discovered that by separating from the crude reaction product the tars from the mercaptobenzothiazole and adding them to succeeding batches of new raw materials, the over-all yields as well as the purity of the mercaptobenzothiazole are increased since the tars present from previous batches apparently permit equilibrium to be established after all the new raw materials react to give mercaptobenzothiazole. Whether or not these assumptions are true, it has been found that the yield of mercaptobenzothiazole in batches to which tars had been added came to the same figure of 85%, thus providing a substantially 100% yield based on the new raw materials added. This briefly is the invention. It will be understood that the invention is not to be limited by any theories expressed herein but that in any event an improved process for preparing mercapto aryl thiazoles is provided by removing from the crude reaction product the tars formed and charging them to subsequent mercapto aryl thiazole-forming materials.

Any method for removing the tars from the crude reaction product may be employed, although it is preferred to extract or leach out the tars with carbon bisulphide in which the tars are soluble but the mercaptobenzothiazole is relatively less soluble. Benzene, toluene, xylene and other hydrocarbon solvents may also be used but, in the Kelly process, are not preferred for the reason that carbon bisulphide is one of the required raw materials and need not be removed from the tars before the addition thereof to subsequent mercaptobenzothiazole-forming materials. With benzene as the solvent, for example, it is advisable to remove it from the tars before their re-use. Any other solvent which dissolves the tars and but little or none of the mercaptobenzothiazole may be used.

The invention may be applied to any commercially practical process, either continuous or batch. Further illustrative of the invention is the following batch example. To a suitable autoclave were charged 93 pounds of aniline, 32 pounds of sulphur and 96 pounds of carbon bisulphide. Heat was applied, the temperature rising to 235–240° C. and the pressure reached a maximum of 850 to 1100 pounds per square inch.

Heating was continued at a low rate sufficient to just maintain the temperature at the reaction range until the reaction reached its limit as evidenced by the end of the rise in pressure. The charge was allowed to cool slightly and then discharged by any suitable means. The discharged crude product was allowed to cool. Weight of this crude product was 159 pounds and its mercaptobenzothiazole content was 86% by weight.

The cooled crude product was then extracted with a solvent, carbon bisulphide, for example, until the extracted material showed a mercaptobenzothiazole content of 97.5–99%. Generally, two or three extractions are necessary to remove enough tars to bring the mercaptobenzothiazole to the desired purity, although this depends somewhat on the extraction procedure and apparatus. Also, counter current handling of the solvent and extract reduces the amount of mercaptobenzothiazole dissolved with the tars. The extracted material weighed 134½ pounds and contained 98.2% mercaptobenzothiazole by weight. Substantially all of the tarry by-product impurities and a small amount of the mercaptobenzothiazole went into solution in the solvent. Adhering solvent was then recovered from the extracted product.

The extract solution was then charged directly to an autoclave with aniline, sulphur, and carbon bisulphide in the proportions given in the second paragraph preceding, allowance being made for the carbon bisulphide content of the extract in adding the new carbon bisulphide. It will be understood that the carbon bisulphide may be removed from the extract solution by distillation, partially or wholly, or the extract solution may be added directly without any removal of the carbon bisulphide. In the batch cited as an example, the carbon bisulphide content of the extract was reduced to 15% by weight, before being charged.

While the weight of tarry material added to the batch cited as an example was 29 pounds, the amount may be varied within wide limits, amounts varying from 21 to 60 pounds of tarry material containing approximately 11% to 15% of $CS_2$ by weight having been added with the same successful results.

Upon the reaction of this batch in the same manner previously described for the batch to which no tars were added, 186 pounds of crude reaction product having a mercaptobenzothiazole content of 86.8% were obtained. This crude product was then extracted with $CS_2$ until the mercaptobenzothiazole content of the extracted material was 97%. The extracted material weighed 161 pounds. The tars from this batch were then charged to another batch of mercaptobenzothiazole-forming materials and the process repeated.

It is thus seen that for an extracted product of substantially the same mercaptobenzothiazole content, no more tars are obtained in the crude reaction products to which tarry extracts from previous batches have been added than from those to which no tarry extracts have been added. Furthermore, an increased yield of mercaptobenzothiazole based on the raw materials charged is provided. And other than the first batch there is no production of tars since the input and output of tars are balanced. In practicing this invention over a long period of time it is, of course, necessary to employ proper aniline-sulphur ratios, for if too much of an excess of sulphur is employed it would be removed in the tars and over a period of time would accumulate, causing an increase in the amount of tars obtained. This, however, is merely a matter of manipulation which any skilled operator will correct.

By these discoveries it is readily apparent that valuable improvements in the manufacture of mercapto aryl thiazoles, particularly by the Kelly process, have been provided. The invention makes available for mercapto aryl thiazole practically all of the by-products normally appearing in the crude reaction product. It makes possible the ready obtention of a mercapto aryl thiazole content in the final product up to 99–100%. The mercapto aryl thiazole obtained also is in a particularly suitable form for pulverizing and sifting. Another very important advantage is the elimination of the steps of adding alkali to the crude reaction product and the acidification of the resulting alkaline mercapto aryl thiazole solution, thereby eliminating the use of alkali and acid and considerable apparatus.

While the invention has been described as applied to the preparation of mercaptobenzothiazole, it will be understood that it may be used in the manufacture of other mercapto aryl thiazoles simply by replacing the aniline with another primary aromatic amine having a replaceable hydrogen on an ortho carbon atom. Illustrative of such amines are o-toluidine, p-toluidine, alpha naphthylamine, beta naphthylamine, the xylidines, o- and p-phenetidine, o- and p-anisidine, 4-aminodiphenyl, etc. Also, the invention is not limited to the Kelly process but may be applied to any batch or continuous process for manufacturing mercapto aryl thiazoles in which an equilibrium is reached with the formation of by-products.

It is further not necessary in the practice of the invention herein described to follow the directions herein given in respect of the proportions employed, the materials reacted and the temperatures and pressures specified: they may be varied within wide limits. Similarly, various changes may be made in other aspects of the invention without departing from the spirit of the invention or from the scope of the appended claims, wherein it is intended to set forth all patentable novelty inherent in the invention.

What I claim is:

1. In the process of preparing mercaptobenzothiazole comprising reacting aniline, sulphur and carbon bisulphide at superatmospheric conditions of temperature and pressure, the improvement which comprises separating the mercaptobenzothiazole from the by-product materials and adding said by-product materials to additional aniline, sulphur and carbon bisulphide.

2. In the process of preparing mercaptobenzothiazole comprising reacting a batch of aniline, sulphur and carbon bisulphide at superatmospheric conditions of temperature and pressure, the improvement which comprises extracting the resulting reaction product with carbon bisulphide and adding the material soluble in the carbon bisulphide to a succeeding batch of aniline, sulphur and carbon bisulphide.

3. In the process of preparing mercaptobenzothiazole comprising reacting aniline, sulphur and carbon bisulphide under superatmospheric conditions of temperature and pressure, the improvement which comprises separating the mercaptobenzothiazole from the resulting reaction product with a solvent in which the by-product materials are soluble but in which the mercaptobenzothiazole is relatively insoluble and returning the said by-product materials to additional aniline, sulphur and carbon bisulphide.

4. In the process of preparing a mercapto aryl thiazole comprising reacting sulphur, carbon bisulphide and a primary aromatic amine having a replaceable hydrogen on an ortho carbon atom under superatmospheric conditions of temperature and pressure, the improvement which comprises separating the mercapto aryl thiazole from the by-product materials and returning said by-product materials to additional sulphur, carbon bisulphide and a primary aromatic amine having a replaceable hydrogen atom on an ortho carbon atom.

5. In the process of preparing a mercaptoarylthiazole comprising reacting carbon bisulphide, sulphur and a primary aromatic amine having a replaceable hydrogen atom on an ortho carbon atom under superatmospheric conditions of temperature and pressure, the improvement which comprises extracting the resulting reaction product with carbon bisulphide and returning the material soluble in the carbon bisulphide to additional sulphur, carbon bisulphide and said primary aromatic amine.

6. in the process of preparing a mercaptoarylthiazole comprising reacting sulfur, carbon bisulfide and a primary aromatic amine having a replaceable hydrogen on the ortho carbon atom under super-atmospheric conditions of temperature and pressure, the improvement which comprises separating the mercaptoarylthiazole from the resulting reaction product with a solvent in which the by-product materials are soluble but in which the mercaptoarylthiazole is relatively insoluble and returning the said by-product materials to additional sulfur, carbon bisulfide and primary aromatic amine.

HAROLD P. ROBERTS.